US009165151B2

(12) United States Patent
Federspiel

(10) Patent No.: US 9,165,151 B2
(45) Date of Patent: Oct. 20, 2015

(54) SYSTEMS, METHODS, AND DEVICES FOR ENCRYPTED DATA MANAGEMENT

(71) Applicant: Fred Federspiel, Larchmont, NY (US)

(72) Inventor: Fred Federspiel, Larchmont, NY (US)

(*) Notice: Subject to any disclaimer, the term of this patent is extended or adjusted under 35 U.S.C. 154(b) by 45 days.

(21) Appl. No.: 13/802,284

(22) Filed: Mar. 13, 2013

(65) Prior Publication Data
US 2014/0281571 A1 Sep. 18, 2014

(51) Int. Cl.
*G06F 21/62* (2013.01)

(52) U.S. Cl.
CPC .................. *G06F 21/6209* (2013.01)

(58) Field of Classification Search
CPC .................. G06F 21/62; G06F 21/606; G06F 2221/2121; G06F 2221/2107
USPC .............. 713/1, 165, 182, 189–193; 380/277, 380/286; 718/1
See application file for complete search history.

(56) References Cited

U.S. PATENT DOCUMENTS

| 2003/0212862 | A1* | 11/2003 | James ........................... 711/115 |
| 2006/0073890 | A1* | 4/2006 | McAllister et al. ............. 463/29 |
| 2008/0065909 | A1* | 3/2008 | Chen ............................. 713/193 |
| 2008/0165957 | A1* | 7/2008 | Kandasamy et al. ........... 380/44 |
| 2010/0185843 | A1* | 7/2010 | Olarig et al. ...................... 713/2 |
| 2011/0252071 | A1* | 10/2011 | Cidon ........................... 707/802 |
| 2012/0297188 | A1* | 11/2012 | van der Linden ............. 713/165 |
| 2013/0117563 | A1* | 5/2013 | Grabelkovsky ............... 713/165 |
| 2013/0173916 | A1* | 7/2013 | Sato ............................. 713/165 |

OTHER PUBLICATIONS

Radix Virtual kSafe Encrypted Virtual Drives, pp. 1-2, Radix Technologies Ltd., 2006.*
VMware Disk Mount User's Guide Virtual Disk Development Kit, pp. 1-12, VMware, Inc., 2008.*
How to encrypt your cloud storage for free, Brad Chacos, PCWorld, www.pcworld.com, Sep. 2012.*

* cited by examiner

*Primary Examiner* — Shanto M Abedin
(74) *Attorney, Agent, or Firm* — Invention Mine LLC

(57) ABSTRACT

Key management for and automount of encrypted files, including recovering a master vault key file from an encoded vault key file, storing the vault key file within a previously mounted crypto key management virtual drive so as to provide a secure scratch pad area for temporary storage of the master vault key file. An open and mount module may then invoke a file mounting procedure by providing the vault key file name and a path corresponding to the crypto key management virtual drive to a virtual drive mounting module. The method of passing the vault key file to the file mounting utility module may comprise passing command line arguments equal to a pathname and filename to the file mounting utility.

15 Claims, 5 Drawing Sheets

SYSTEMS, METHODS, AND DEVICES FOR ENCRYPTED DATA MANAGEMENT

The field of the invention generally relates to managing data security and cryptographic encryption keys.

BACKGROUND

Much of today's data storage includes the encryption of the data, whether the data is stored locally in a device memory or hard drive, on a local area network server, or transmitted remotely to another computer system or network for storage. Encryption is desired to protect the data in the event the device with the data is lost or otherwise compromised, or if the data is intercepted while in transmission. With the need for encryption also comes the need to effectively manage the associated cryptographic keys. As a practical matter, good cryptographic keys contain too many characters for a person to commit to memory and must therefore be stored in an electronic form until ready for use. The requirement to store the cryptographic keys for later use, and the transmission of the keys to the encryption software presents challenges in maintaining the security of the keys.

SUMMARY

The methods and devices described herein provide an effective personal layer of protection around sensitive information. A primary security vulnerability with modern data encryption is password "guess-ability", and in one embodiment, the disclosure describes a 2-factor security to protect web accounts and sensitive data with practically un-guessable 64 character random passwords. In one embodiment, the encryption methods and devices may be used in conjunction with cloud-based storage services such as DropBox or Google Drive accounts, ensuring that sensitive data is conveniently stored, backed-up, and even shared with trusted colleagues, all while protected by un-guessable passwords.

The system uses a cryptography key storage device, also referred to herein as a Personal Key Device (PKD), in the form of a physical storage device such as a Universal Serial Bus (USB) thumb drive, or other storage device.

Described herein are methods and systems for generating, protecting, and otherwise managing cryptographic key files used in conjunction with well-known encryption and file mounting operations. In one embodiment, a key management module obtains or generates a master key file, or vault key file, for a data vault and uses it to activate a PKD by storing an encoded version of the master key file on the PKD. The encoded vault key file is thus an obscured/encoded master key file, and is also referred to herein as the personal key file. A key-management module may then recover the master key file and use it to command a file mount utility to mount the data vault file as a secure virtual drive.

BRIEF DESCRIPTION OF THE SEVERAL VIEWS OF THE DRAWINGS

The accompanying drawings, which are incorporated in and constitute part of this specification, illustrate certain embodiments of the invention and together with the description serve to explain the principles of the present disclosure. The embodiments illustrated herein are presented as examples, it being understood, however, that the invention is not limited to the precise arrangements and instrumentalities shown, wherein.

DETAILED DESCRIPTION

Figure 1:
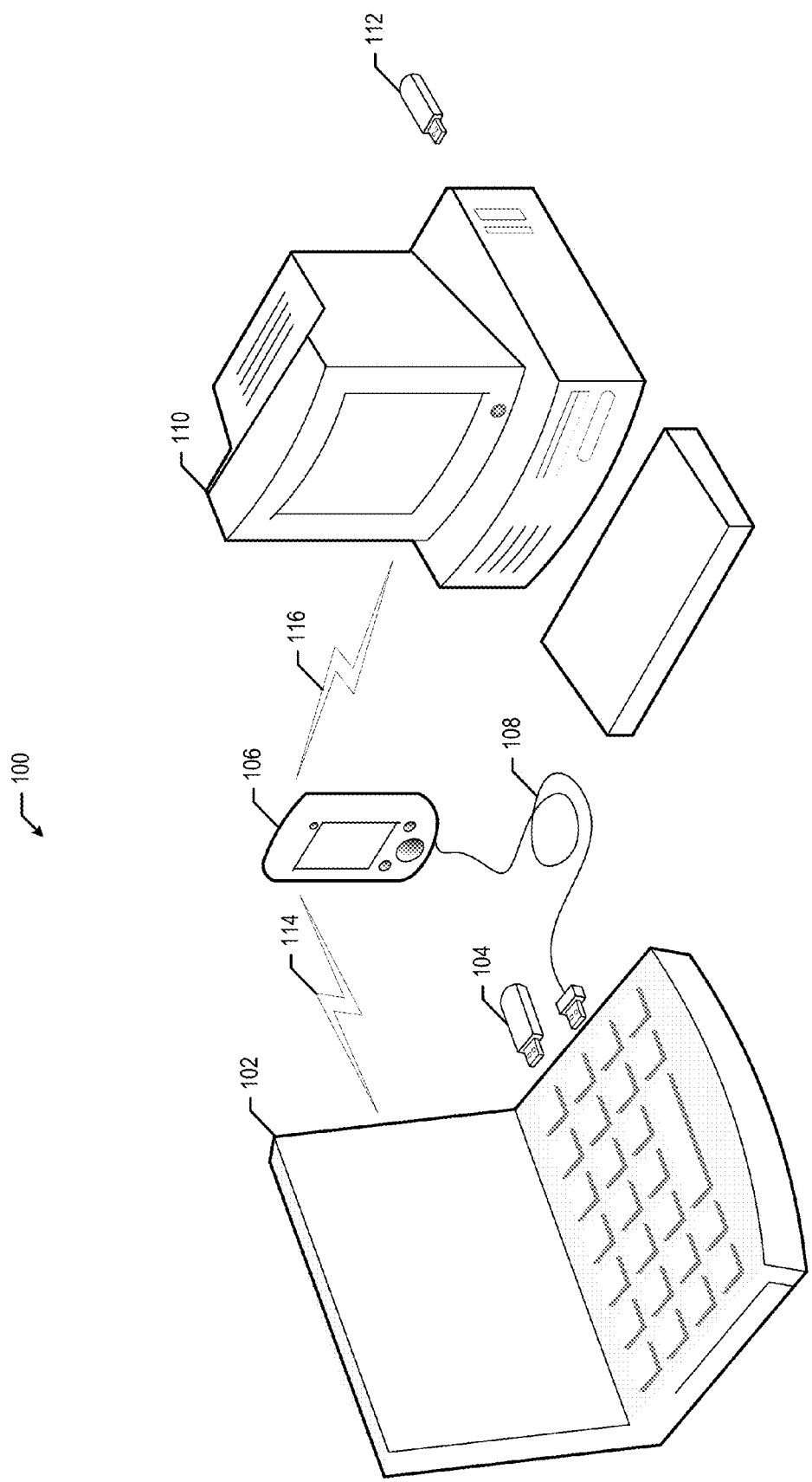
FIG. 1 is a diagram of various computer systems according to some embodiments.

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

In one embodiment, the system uses encrypted virtual drive files, or data vault files, that are encrypted using on-the-fly encryption whenever data is read from or written to the data vault file. The data vault files may be stored in any location, such as a device hard drive, a network drive, or a commercial cloud service like DropBox or Google Drive, and are accessed using well-known encryption algorithms. A vault file can be as small as 1 Mbyte, useful to store critical information like passwords and account information, or large enough to store HD movies. In any case, a vault file is a file that can be backed up, synchronized and shared using cloud services, and be copied and deleted just like any other file. The vault file may not be opened without the master key file. The master key file is kept in a secure location and accessed when additional PKDs need to be activated.

The vault file may be used to mount a virtual drive in a computer system, and thus is also referred to herein as an encrypted virtual drive file. When mounted, the vault appears as another disk drive such that a user can transparently yet securely store any documents or applications. The encryption utility is often combined within existing virtual drive management utilities. In one embodiment, a secure drive mount utility known as TrueCrypt may be used to perform the encryption/decryption and file mounting procedures. Other embodiments may use similar utilities such as Free OTFE, or Crypt4Free.

Vault files are easily created for securely storing data and/or and applications. A master key file is used whenever a new vault file is created. In one embodiment, the master key file contains a string of 256 randomly-chosen characters, but the master key file may have a longer or shorter length as desired. The master key file is then stored in a safe place such as on a removable USB thumb drive called a Master Key Device, or "MKD". Each MKD can hold the master key files to several vaults. The MKDs are intended to be stored securely and only utilized to make PKDs.

PKDs may be portable physical storage devices such as a Universal Serial Bus (USB) thumb drive, Secure Digital (SD) Card, other storage device such as a Personal Digital Assistant (PDA), tablet computer, iPad, or mobile phone, including iOS devices or Android devices with a key-management application running thereon. The cryptographic key storage device may also include an additional level of security, provided via measures such as biometric authentication in the form of fingerprint, voiceprint, retinal scan, or other suitable authentication schemes known in the art.

With reference to FIG. 1, a computer such as laptop 102 or desktop 110 may be configured to communicate with the PKD such as USB 104, 112, or with mobile device/PDA 106. The communication may be over any wired or wireless communication medium, including a local communication medium such as a USB bus, Thunderbolt bus, Bluetooth, Zigbee, 802.11 wifi, etc. Thus, the PKD in the form of PDA 106 may communicate via a wired connection 108 or a wireless connection 114, 116.

Figure 2:
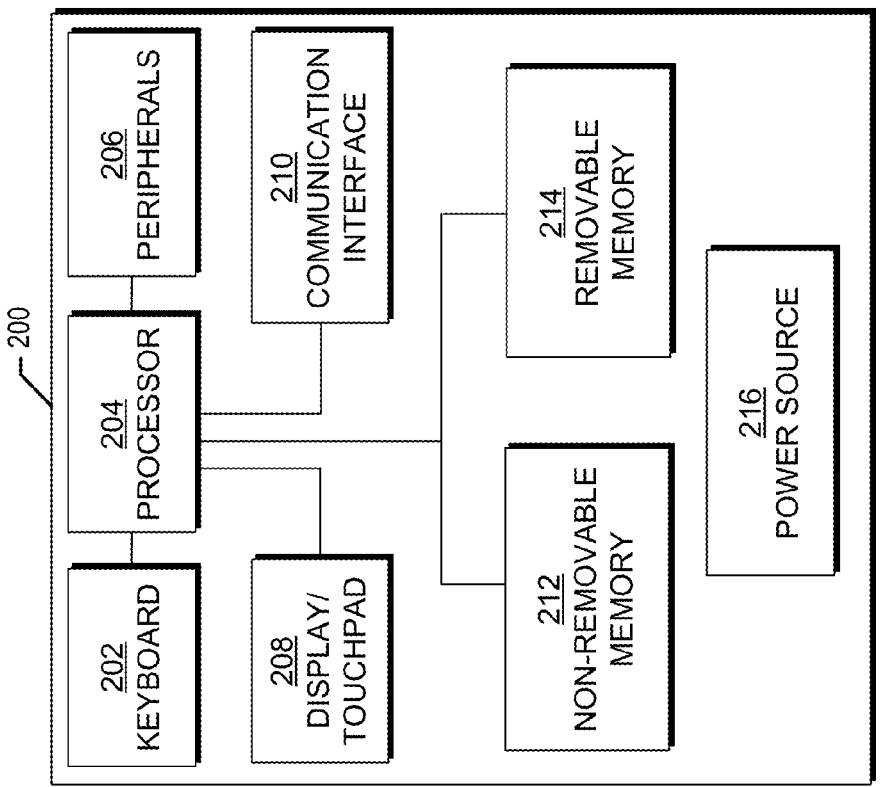
FIG. 2 is a functional block diagram of a computer system according to some embodiments.

With reference to FIG. 2, the computer may be configured with a processor 204 in communication with memory devices 212, 214. Memory device 212 may be a nonremovable memory device such as RAM, or ROM, magnetic or optical storage. Memory device 214 may be a removable memory device such as a flash card, USB drive, detachable hard drive storage etc. The memory devices 212, 214 may be used to store computer readable instructions that when executed by the processor 204 cause the computer 200 to implement methods described herein. The processor 204 may also communicate with correct role devices 206, keyboard 202, a display/touchpad 208, and a communication interface 210, and may be powered by power source 216, which may be driven by a battery or other voltage source. The communication interface 210 may provide access to a wired or wireless local communication medium as described above.

As will be appreciated by one skilled in the art, aspects of the present disclosure and of computer system 200 may be embodied as an apparatus that incorporates some software components. Accordingly, some embodiments of the present disclosure, or portions thereof, may combine one or more hardware components such as microprocessors, microcontrollers, or digital sequential logic, etc., such as processor 204 with one or more software components (e.g., program code, firmware, resident software, micro-code, etc.) stored in a tangible computer-readable memory device such as memory 212/214, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms. In addition, some embodiments of the apparatus may include a tangible computer readable medium containing instructions stored therein that when executed by a processing device cause the processing device to implement the methods as described herein.

Figure 3:
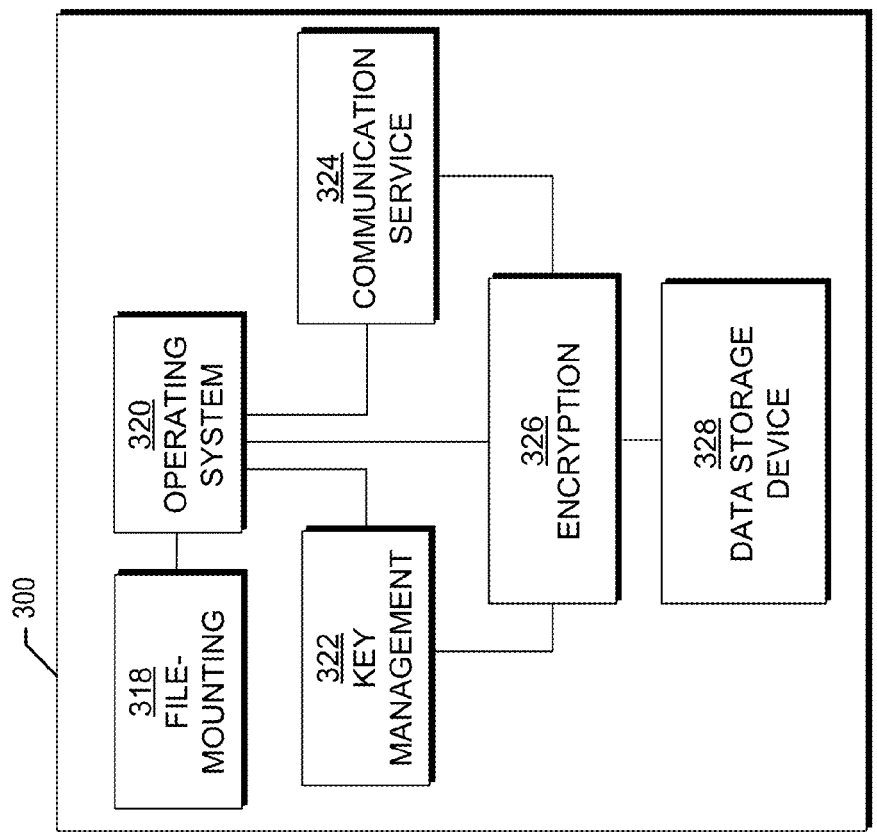
FIG. 3 is a depiction of exemplary computer modules for use in data encryption.

With reference to FIG. 3, the computer system 300 will be described in terms of modules. The operating system module 320 provides for basic services associated with the computer platform as known to those of skill in the art. Similarly, functions of the communication services module 324 are well known. The encryption utility module 326 provides for on-the-fly encryption and decryption of data destined for data storage device 328. File mounting module 318 operates on vault files located within data storage device 328 in conjunction with encryption module 326 to make vault files accessible as a virtual disk drive. File mounting module 318 and encryption module 326 may be configured by installing Truecrypt software, or other similar utilities, onto the computer platform 300. Key management module 322 is configured to interact with file mounting module 318 and encryption module 326 as described herein.

PKDs are intended to by carried by individual users on a keychain, or in a wallet or purse. The PKD stores an encoded version of the master key file, which is protected by a user's password or PIN. In some embodiments PKDs do not contain any confidential data, which is preferably stored separately within a vault. But together with the password, the PKD does enable calculation of the master Keyfiles for a user's vaults.

In some embodiments, a crypto-key-management vault file serves as a type of encrypted scratchpad for use in mounting other vault files or for otherwise passing master decryption key files or master passphrases to an encryption/decryption module, so as to ensure that critical information such as a master key file or passphrase is never written to disk in clear text. In particular, the file-mounting utility may be instructed to mount the crypto-key-management vault file using a crypto-key-management key file, and a key management module may then have access to that mounted secure drive, or crypto-key-management virtual drive, for use in storing additional data. In particular, the key management module may obtain the personal key file, which is an encoded form of the master key file, and then decode it using, for example, a hashing algorithm. In various embodiments, decoding may include e.g., an X-OR operation with a hash of the secondary user's PIN or password, modulo arithmetic with the hash, or decryption using the hash as a key The decoded master key file may then be easily stored in the crypto-key-management vault file, as it has been made readily available as a crypto-key-management virtual drive. The file-mounting utility may then obtain the master key file from the crypto-key-management virtual drive by providing the filename and pathname (i.e., the location) of the master key file to the file-mounting utility.

Figure 4:
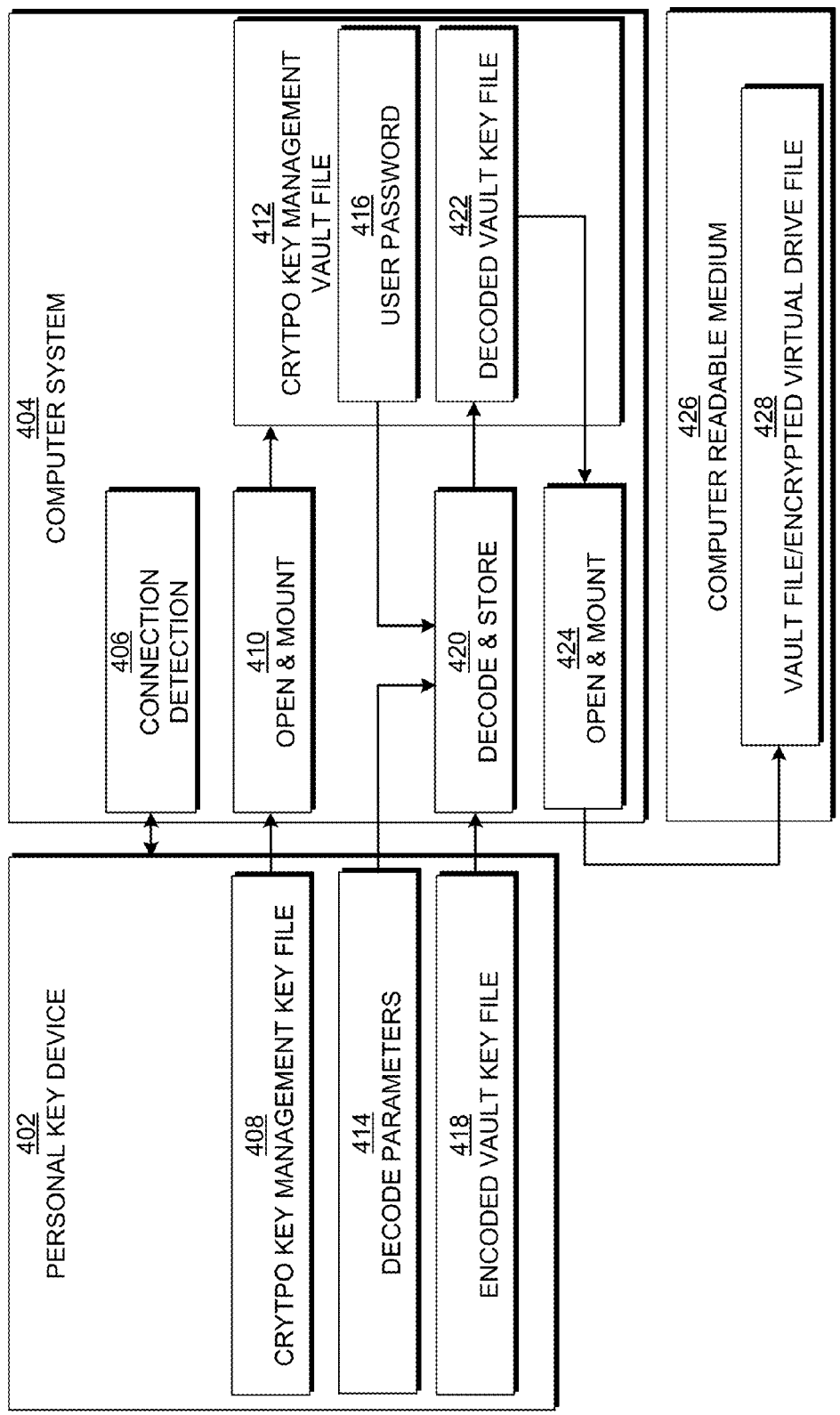
FIG. 4 is a further depiction of computer modules and data storage according to some embodiments.

With reference to FIG. 4, an embodiment of a method of securely mounting a vault file will be described. The PKD 402 is connected to computer system 404. The nature of the connection depends upon the particular embodiment of the PKD. The connection may be by a physical linkage such as insertion of a USB/SD PKD, or cable connection to a PDA PKD, hard drive or flash drive PKD, etc. The connection may be wireless for PKD's equipped with wireless communication services, such as mobile phones, PDAs, hard drives or flash drives having integrated Wi-Fi, etc.

The connection detection module 406 may detect the presence of the PKD 402. In some embodiments connection detection module 406 may monitor certain directories for changes that would indicate the insertion of a physical storage device. For example, for computers operating using a Windows environment, a task scheduler may be used to indicate when a specific windows event is logged, such as when the operating system detects the insertion of a USB drive. In an Apple Macintosh operating system environment, the Folder Action utility may be configured to notify the connection detection module 406 that an item has been added to a Directory, called a volume, whereupon the connection detection module 406 can scan for the presence of devices containing encoded vault key files 418, master keys (not shown), predetermined file structures, or decode parameters 414, associated with the PKD 402.

In alternative embodiments the connection detection module 406 may establish a wireless communication session with PKD 402. The communication session may include an authentication procedure, such as the challenged-handshake protocol (CHAP).

In the event that a PKD is detected, open and mount module 410 is configured to retrieve a crypto key management key file 408 from the PKD 402 and use it the mount a crypto key management vault file 412 that was previously stored on computer system 404. The decode and store module 420 is configured to retrieve the encoded vault key file 418, as well as a user password 416. The user password 416, which may have been previously stored in crypto key management vault file 412, or which may be obtained through a user interface presented to a user, may be used to generate a hash value that is then used to decrypt, or decode, the encoded vault key file. In addition the decode and store module 420 may also obtain further decode parameters 414 for use in recovering the vault key file from the encoded vault key file. In one embodiment, decode parameters 414 can be concatenated with the password prior to generating the hash value. The decode parameters 414 may include a USB or other PKD device serial number, a read write indicator, such as a single bit, a PKD license authentication code, a "salt" or randomly-generated string of data stored on the PKD, etc. The decoding operation may comprise e.g., X-OR operation with the hash of the secondary user's PIN or password, modulo arithmetic with the hash, or decryption using the hash as a key file.

The decoded vault keyfile 422 may be stored in the crypto key management vault file 412. The open and mount module 424 may generate virtual drive mount parameters and use them to mount the encrypted virtual drive file 428. In one embodiment the parameters are provided to a mounting module such as that provided by TrueCrypt. In particular, the path name and filename of the decoded vault keyfile may be passed to TrueCrypt such that the decoded vault key file 422 is not stored insecurely, or passed in plaintext such as by a command line argument.

In one embodiment the insertion of the PKD into a computer, or otherwise establishing a communication session with the connection detection module 406, will either generate a prompt for a password, or automatically scan for the presence of a stored password, and will then automatically decrypt and mount all vault files that are stored anywhere accessible to that computer. In one embodiment, each vault is associated with a separate directory/folder tree present on the PKD as shown in table 1.

TABLE 1

User Token Directory Structure

Top Level of User PKD Token:
    SetupPC - script to install software on a new Windows client
    SetupMac - script to install software on a new Mac client
    CyberKey - (product name)
        Resources - folder holding files needed to install on new client
            {several files to be moved onto client system}
        Keys - folder holding User Keys
            Automount - folder holding User Keys that correspond to
            the user's encrypted areas
                ReadWrite - folder holding keys for read/write crypts
                    cryptname.key - potentially several text files, each
                    holding a User Key (encoded master key) for a TABLE 1-continued User Token Directory Structure crypt
                ReadOnly - folder holding keys for read-only crypts
                    cryptname.key - potentially several text files, each
                    holding a User Key for a crypt
    PassProtect - folder holding info for local scratch area
    (which may be used to store password on a client machine)
        XXXXXXXX - folder corresponding to a client
        computer
            n - zero-length file whose name indicates which
            scratch area to use on client computer
            XXXXXXXX
        YYYYYYYY - folder corresponding to a different
        client computer
            m - zero-length file whose name indicates which
            scratch area to use on a client computer
            YYYYYYYY Note that in Table 1, the parameter XXXXXXXX—corresponds to a random 8-digit "CompID" code generated by a client computer upon installation of the system software. When a PKD is used for the first time on a particular client device, a folder named with the CompID code is created on the PKD, and a file name "n" is placed in the newly created directory. The scratch area, which is also referred to herein as a crypto-key management vault file, having a filename "n" is then created and stored on the computer where the key management module resides. Every time a new PKD is inserted, the software reads the directory structure to check for the CompID folder corresponding to the computing platform, and if detected, it can check to see if a password has been stored on that computer within the scratch area In one embodiment, with respect to the parameter n, the first PKD inserted into a client computer will receive n=1, such that a zero-length file with name "1" will be created in the directory XXXXXXXX, where XXXXXXXX is the CompID of that client computer.

In a further embodiment, after a vault file is successfully mounted, an application execution module checks for executable applications stored in the newly mounted directory structure. One example of this capability is to automatically launch a web browser that stores some or all of the associated web passwords in a secure fashion.

By default, the information in a vault file is protected by encryption, which in the embodiments using TrueCrypt is an implementation of AES-256, Serpent, TwoFish, or cascades of AES, Serpent, and TwoFish as desired. The only known exploitable vulnerability to this protection is password vulnerability. Passwords shorter than 12 characters can be found quickly and cheaply through exhaustive search (or "brute force"), and tools automating this search are widely available to thieves. Passwords longer than 20 randomly-chosen characters are not practical to guess with current technology. To decrypt a vault, the key management module feeds a 256 character randomly-generated Master Keyfile into TrueCrypt, which generates a 64-character password from a sequence of hashing operations on the value contained in the key file.

Figure 5:
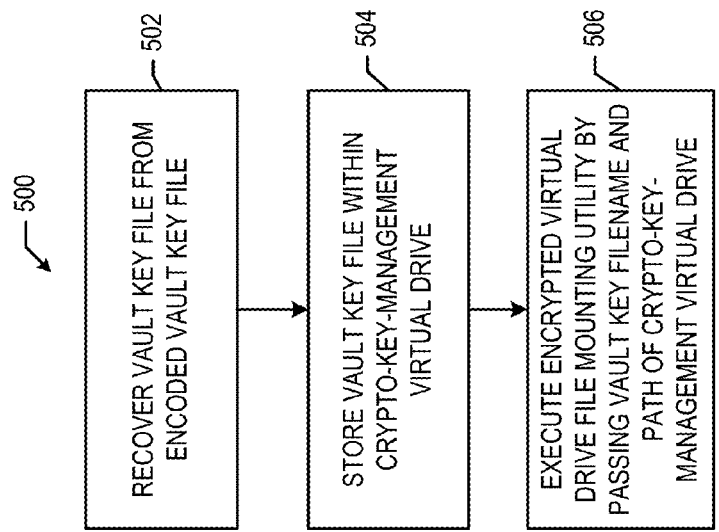
FIG. 5 is a flowchart of one method of an embodiment.

With respect to FIG. 5, an embodiment of one method 500 of mounting an encrypted virtual drive will be described. Method 500 comprises recovering a vault key file from an encoded vault key file. The recovery 502 may be performed by generating a hash value from a password and other encoding parameters, and decoding the encoded vault key file using the hash value. The vault key file may be stored 504 within a crypto key management virtual drive. The crypto key management virtual drive may have been previously mounted so as to provide a secure scratch pad area for temporary storage of the master vault key file. An open and mount module may then invoke a file mounting procedure 506 by providing the vault key file name and a path corresponding to the crypto key management virtual drive to a virtual drive mounting module. The method of passing the vault key file to the file mounting utility module may comprise passing command line arguments equal to a pathname and filename to the file mounting utility.

Figure 6:
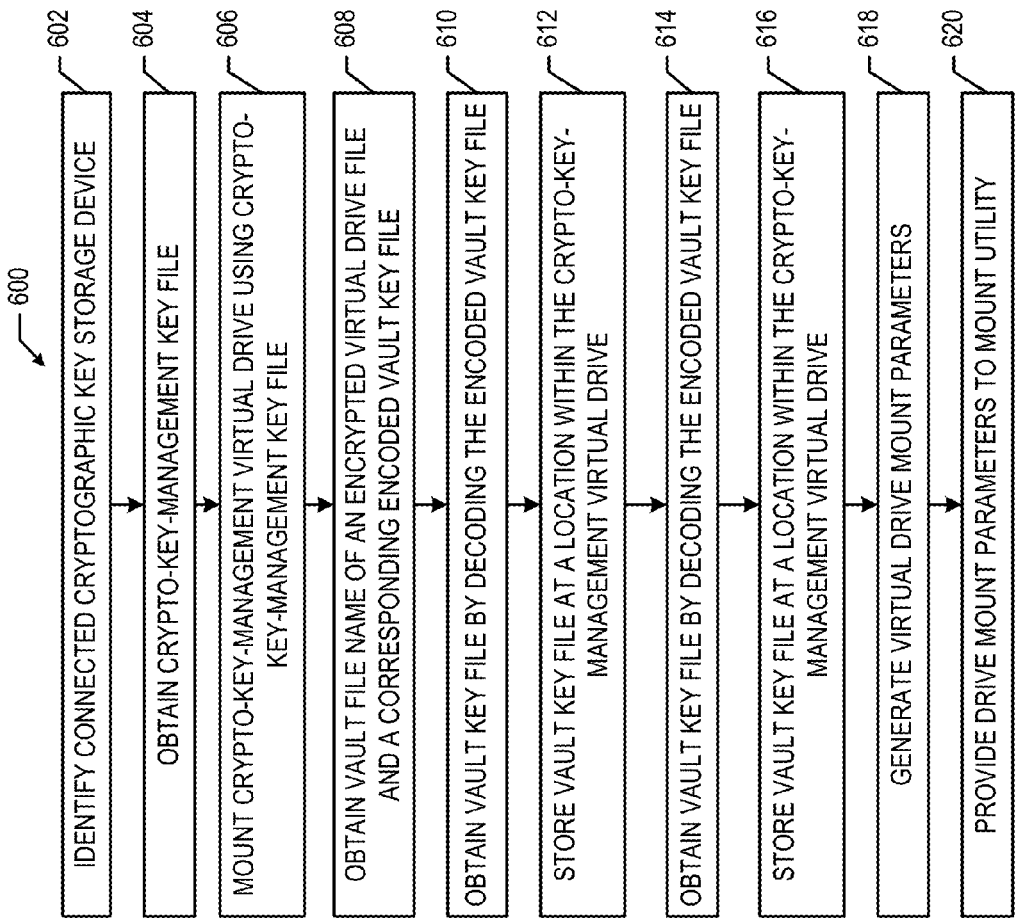
FIG. 6 is a flowchart of an alternative method according to some embodiments; and, FIG. 7 is a flowchart of one method of an embodiment of generating new personal key devices.

With reference to FIG. 6, a method 600 of an alternative embodiment will be described. Method 600 comprises identifying 602 a connected cryptography key storage device on a local communication medium of a computing system. The method then obtains 604 a crypto-key-management key file from the key storage device, and mounts 606 a crypto-key-management virtual drive from a crypto-key-management vault file stored on the computing system using the crypto-key-management key file. Method then obtains 608 a vault file name of an encrypted virtual drive file and a corresponding encoded vault key file from the key storage device. The vault key file is obtained 610 by decoding the encoded vault key file, which is stored 612 in the vault key file at a location within the crypto-key-management virtual drive, the location being identifiable by a location parameter. Method then generates 614 virtual drive mount parameters including the location parameter, which are then provided 620 to an encrypted virtual drive file mounting utility. In an embodiment, the method may perform identifying a connected cryptography key storage device by detecting a directory change using either a task scheduler event or a folder action event. In a further embodiment, the method 600 may identify a connected cryptography key storage device by detecting communication from an application on an authenticated mobile device.

In a further embodiment, the method 600 may decode the encoded vault key file by obtaining decoding parameters; generating a hash value from the decoding parameters; and obtaining the vault key file by decoding the encoded vault key file using the hash value.

The method 600 may utilize decoding parameters including one or more parameters selected from the group consisting of a password, a read/write value, a serial number, a vault file name, a vault file location, and a license key value.

In further embodiments, the method 600 may further comprise un-mounting the crypto-key-management virtual drive after mounting the virtual drive. In still other embodiments, the method 600 may further include automatically un-mounting the crypto key management virtual drive after the user's data virtual drive is mounted.

In some embodiments, the method may further comprise detecting the disconnection of the cryptography key storage device (PKD) and responsively un-mounting the virtual drive.

In yet another embodiment, a key-management module may mount a crypto-key management virtual drive, and then use the mounted drive to store a decoded master key file. The key-management module may then instruct an encryption/decryption utility to use the decoded master key file, such as by providing the path and filename of the master key file within the mounted crypto-key-management virtual drive. In one particular embodiment, a PGP (Pretty Good Privacy) utility may be installed on a computer system, and be configured to use a master key file in the form of a very long master pass phrase. An owner, or primary user, of the encryption master key, may wish to access certain encryption keys (for example, his PGP Private Key) without needing to type, or even recall the long master pass phrase. The master pass phrase may be encoded (i.e, exclusive OR operation, modulo arithmetic, and/or encryption) based on the user's password or PIN and stored on a PKD. As described above, the key-management utility may use TrueCrypt or similar utility to mount a crypt-key-management virtual drive as described herein above. The long master pass phrase may be retrieved from the PKD and decoded (i.e., X-OR operation with a hash of the secondary user's PIN or password, modulo arithmetic with the hash, or decryption using the hash as a key) and securely stored in the mounted crypto-key-management virtual drive. The Key-management utility may then provide the location of the decoded master pass phrase to the PGP utility.

In further embodiments, the method may further comprise executing software instructions stored in the virtual drive. That is, in one example, an executable browser program may be fully contained within the virtual drive and may be retrieved from that location and dynamically decrypted prior to execution. In this manner, any information contained within the browser settings, such as passwords, bookmarks, or other data, may be inaccessible except for when the encrypted virtual drive is mounted using the methods described above. In an alternative embodiment, a browser or other program may be configured to store data or one or more files, including temporary data and/or files, password data and/or files, bookmark data and/or files, and the like, within the mounted encrypted virtual drive. In this embodiment, the entire program need not be stored within the encrypted drive, but rather only particularly sensitive data associated with the execution and/or operation of the particular program. In yet a further embodiment, the data stored in the encrypted virtual drive may include environment variables, configuration files, and temporary files.

Figure 7:
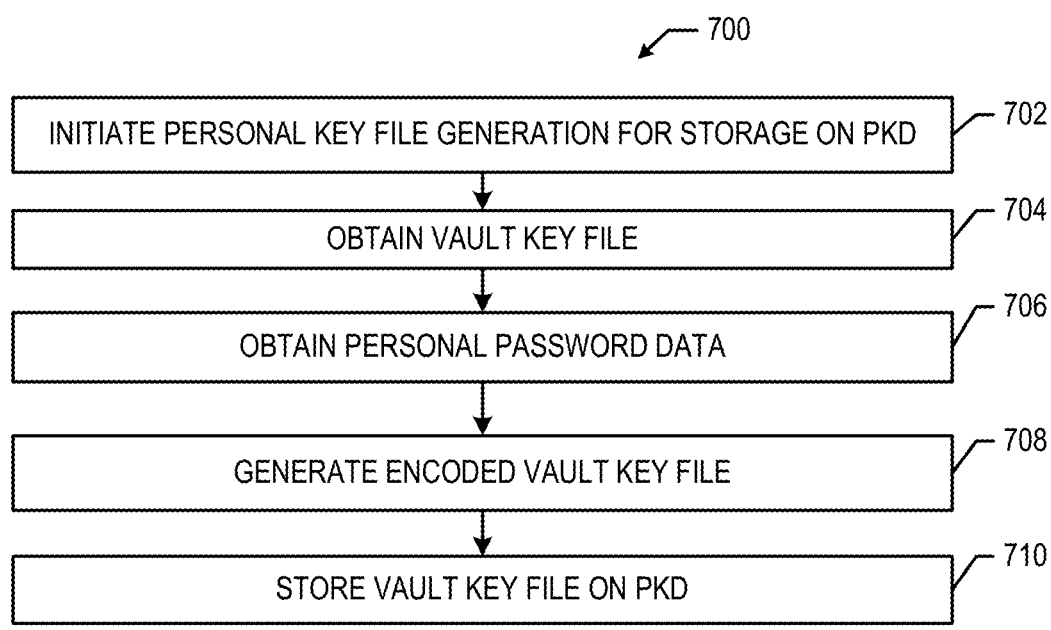

In a further alternative embodiment shown in FIG. 7, a method 700 comprises initiating a personal key file generation process 702. This may be performed, for example, on a computer system, having a user interface screen that allows a user to initiate the generation of a personal key file for storage on a portable cryptographic key storage device in communication with the computer system. A vault key file corresponding to an encrypted virtual drive file is obtained at 704. The vault key file is the master key file controlled by a primary user. The master key file may be stored on a separate USB storage device or other suitably secure storage means. Personal password data is obtained at 706. This may be obtained through a user interface, and may be supplied by the primary user that is controlling the key generation operation, or the user who is being given the PKD may enter the password either via the user interface on the primary user's computing device, or the password submission may be facilitated by an intermediary server that presents a separate user interface to the secondary user (via a web page presented to the secondary user's computer, or other transaction mechanism such as an email exchange, etc.). An encoded vault key file is generated at 708. This may be performed as described above by encoding the vault key file with the personal password data, or a hash of the password data, or a combination of other encoding parameters as described herein, such as a serial number, a read/write parameter. The encoded vault key may then be stored 710 on a portable cryptographic key storage device, referred to herein as a PKD. In some embodiments, the encoded key may be stored on the PKD using a file structure as described above with reference to Table 1.

Additional embodiments may include an apparatus comprising: a key-management module configured to obtain an encoded vault key file from a personal key device and to generate a vault key file from the encoded vault key file and to store the vault key file within a crypto-key-management virtual drive; a drive-mounting module configured to generate virtual drive mounting parameters and to pass the virtual drive mounting parameters to an encrypted virtual drive file mounting utility wherein the virtual drive mounting parameters include a filename of the vault key file stored in the crypto-key-management virtual drive.

The apparatus may include a key-management module configured to obtain the encoded vault key file from a personal key device, and further configured to: obtain a password; generate a hash value from the password; and, obtain the vault key file by decoding the encoded vault key file using the hash value, such as by e.g., X-OR operation with a hash of the secondary user's PIN or password, modulo arithmetic with the hash, or decryption using the hash as a key. The key-management module may also be configured to obtain the password from the crypto-key management virtual drive.

In yet another embodiment, the apparatus comprises: a key management module configured to: (i) identify a connected cryptography key storage device on a local communication medium of a computing system; and (ii) obtain a crypto-key-management key file from the key storage device; a drive mounting module configured to mount a crypto-key-management virtual drive from a crypto-key-management vault file stored on the computing system using the crypto-key-management key file; the key-management module further configured to (i) obtain a vault file name of an encrypted virtual drive file and a corresponding encoded vault key file from the key storage device; (ii) obtain a vault key file by decoding the encoded vault key file; (iii) store the vault key file at a location within the crypto-key-management virtual drive, the location being identifiable by a location parameter; the drive mounting module further configured to (i) generate virtual drive mount parameters including the location parameter; and, (ii) provide the virtual drive mount parameters to an encrypted virtual drive file mounting utility.

Variations of the apparatus may include embodiments configured to identify a connected cryptography key storage device by detecting a directory change using either a task scheduler event or a folder action event.

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combinations of systems, devices, and functional blocks, as would be known to those skilled in the art.

In general, it should be understood that the circuits described herein may be implemented in hardware using integrated circuit development technologies, or via some other methods, or the combination of hardware and software objects could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed:

1. A method comprising:
   identifying a connected cryptography key storage device on a local communication medium of a computing system;
   obtaining a crypto-key-management key file from the key storage device;
   mounting a crypto-key-management virtual drive from a crypto-key-management vault file stored on the computing system using the crypto-key-management key file;
   obtaining a vault file name of an encrypted virtual drive file and a corresponding encoded vault key file from the key storage device;
   obtaining a vault key file by decoding the encoded vault key file, wherein decoding the encoded vault key file comprises obtaining decoding parameters, generating a hash value from the decoding parameters, and obtaining the vault key file by decoding the encoded vault key file using the hash value;
   storing the vault key file at a location within the crypto-key-management virtual drive, the location being identifiable by a location parameter;
   generating virtual drive mount parameters including the location parameter; and
   providing the virtual drive mount parameters to an encrypted virtual drive file mounting utility.

2. The method of claim 1 wherein identifying the connected cryptography key storage device comprises detecting a directory change using either a task scheduler event or a folder action event.

3. The method of claim 1 wherein identifying the connected cryptography key storage device comprises detection of a communication from an application on an authenticated mobile device.

4. The method of claim 1 wherein the decoding parameters include one or more parameters selected from the group consisting of a password, a read/write value, a serial number, a vault file name, a vault file location, and a license key value.

5. The method of claim 4 wherein the read/write value is obtained based on a directory in which an encoded master key is located.

6. The method of claim 1 further comprising un-mounting the crypto-key-management virtual drive after mounting the virtual drive.

7. The method of claim 1 further comprising detecting disconnection of the cryptography key storage device and responsively un-mounting the virtual drive.

8. The method of claim 1 further comprising executing software instructions stored in the virtual drive.

9. The method of claim 1 further comprising retrieving and/or storing data in the virtual drive, the data selected from one or more of the data types of the group of data types consisting of environment variables, configuration files, and temporary files.

10. An apparatus comprising:
    a key management module configured to: (i) identify a connected cryptography key storage device on a local communication medium of a computing system and (ii) obtain a crypto-key-management key file from the key storage device; and
    a drive mounting module configured to mount a crypto-key-management virtual drive from a crypto-key-management vault file stored on the computing system using the crypto-key-management key file;
    the key-management module further configured to (i) obtain a vault file name of an encrypted virtual drive file and a corresponding encoded vault key file from the key storage device; (ii) obtain a vault key file by decoding the encoded vault key file by obtaining decoding parameters, generating a hash value from the decoding parameters, and obtaining the vault key file by decoding the encoded vault key file using the hash value; (iii) store the vault key file at a location within the crypto-key-management virtual drive, the location being identifiable by a location parameter;
    the drive mounting module further configured to (i) generate virtual drive mount parameters including the location parameter and (ii) provide the virtual drive mount parameters to an encrypted virtual drive file mounting utility.

11. The apparatus of claim 10 wherein the key management module is configured to detect a directory change using either a task scheduler event or a folder action event.

12. The apparatus of claim 10 wherein the key management module is configured to detect a communication from an application on an authenticated mobile device.

13. The apparatus of claim 10 wherein the decoding parameters include one or more parameters selected from the group consisting of a password, a read/write value, a serial number, a vault file name, a vault file location, and a license key value.

14. The apparatus of claim 10 wherein the key-management module is further configured to automatically execute software instructions stored in the virtual drive.

15. The apparatus of claim 10 wherein the key-management module is further configured to retrieve and/or store data in the virtual drive, the data selected from one or more of the data types of the group of data types consisting of environment variables, configuration files, and temporary files.

* * * * *